United States Patent Office 3,180,708
Patented Apr. 27, 1965

3,180,708
METHOD FOR PREPARING DIBORON TETRAFLUORIDE
Allen L. McCloskey, Costa Mesa, Harold M. Manasevit, Anaheim, and Robert J. Brotherton, Fullerton, Calif., assignors to United States Borax & Chemical Corporation, Los Angeles, Calif., a corporation of Nevada
No Drawing. Original application Mar. 22, 1961, Ser. No. 97,473. Divided and this application Sept. 23, 1964, Ser. No. 398,789
1 Claim. (Cl. 23—205)

The present invention relates as indicated to a process for preparing diboron tetrafluoride.

This application is a division of our copending application Serial No. 97,473, filed March 22, 1961.

Diboron tetrafluoride has heretofore been produced by reactions involving the use of diboron tetrachloride, which methods are commercially impracticable due to the cost and the limited availability of diboron tetrachloride. Thus, due to the limited availability and prohibitive cost of diboron tetrachloride; diboron tetrafluoride, while having exhibited many interesting and desirable chemical properties, has remained more or less a laboratory curiosity.

By means of the present invention, diboron tetrafluoride may now be produced economically in commercial quantities.

It is therefore the principal object of the present invention to provide a new and economically desirable method for the preparation of diboron tetrafluoride.

Other objects of this invention will appear as the description proceeds.

To the accomplishment of the foregoing and related ends, said invention then comprises the features hereinafter fully described and particularly pointed out in the claim, the following description setting forth in detail certain illustrative embodiments of the invention, these being indicative, however, of but a few of the various ways in which the principle of the invention may be employed.

Broadly stated, the present invention comprises the method for preparing diboron tetrafluoride which comprises reacting a material selected from the group consisting of boron monoxide and $B_2(OR)_4$ with sulfur tetrafluoride at a temperature below ambient temperature in a substantially anhydrous oxygen-free atmosphere and recovering substantially pure diboron tetrafluoride, wherein R is a material selected from the group consisting of hydrogen, unsubstituted saturated aliphatic hydrocarbon radicals, substituted saturated aliphatic hydrocarbon radicals having aromatic hydrocarbon substituents, unsubstituted aromatic hydrocarbon radicals, and substituted aromatic hydrocarbon radicals having unsubstituted saturated aliphatic hydrocarbon substituents.

The reactions of the foregoing broadly stated paragraph can best be illustrated by the following general equations:

(1)   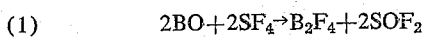
$$2BO + 2SF_4 \rightarrow B_2F_4 + 2SOF_2$$

(2)   
$$B_2(OR)_4 + 4SF_4 \rightarrow B_2F_4 + 4SOF_2 + 4RF$$

where R is a material as described above.

We have found that at above ambient temperatures, side reactions occur and thus lower temperatures are preferable. Therefore, in the preferred embodiment of our invention we use temperatures of from about 0° C. to about −100° C.

The best yields are obtained when about stoichiometric amounts of reactants are used. However, the reaction readily proceeds when more or less than stoichiometric amounts of sulfur tetrafluoride is present. Diboron tetrafluoride has been produced from reactions wherein from about 15% less to about 15% excess of the stoichiometric amount of sulfur tetrafluoride was used. However, as noted above, stoichiometry is preferred.

The following list is illustrative of the diboron compounds which are applicable to the present invention:

Tetrahydroxydiboron
Tetramethoxydiboron
Tetraethoxydiboron
Tetraisopropoxydiboron
Tetra(t-butoxy)diboron
Tetra-(2-hexyloxy)diboron
Tetra-(n-octyloxy)diboron
Tetra-(2-phenylethoxy)diboron
Tetra-(3-phenylbutoxy)diboron
Tetraphenoxydiboron
Tetra-(α-naphthoxy)diboron
Tetra(quinolin-8-oxy)diboron
Tetra(2,3-diethylphenoxy)diboron
Tetra-(1-phenylpropoxy)diboron It is to be clearly understood that the foregoing list is only a partial enumeration of the diboron compounds which are applicable to the present invention and is in no way intended to limit the invention.

So that the present invention can be more clearly understood, the following examples are given for illustrative purposes.

I. Boron monoxide and about 5% in excess of the stoichiometric amount of sulfur tetrafluoride were mixed at about −80° C. or below in an anhydrous oxygen-free system. The temperature of the reaction mixture was held at about −80° C. for a period of 16 hours. The reaction mass was then warmed slowly to room temperature and the volatile constituents separated by fractional condensation with the subsequent recovery of diboron tetrafluoride. The diboron tetrafluoride was identified by vapor pressure, molecular weight, melting point and infrared spectrum determinations which were substantially identical with the known data for diboron tetrafluoride.

II. Stoichiometric amounts (as shown in the foregoing equations) of tetrahydroxydiboron and sulfur tetrafluoride were mixed below −60° C. in an anhydrous oxygen-free system. The temperature of the reaction mixture was adjusted to about −60° C. and held there for a period of 8 hours. The reaction mass was then warmed slowly to room temperature and the volatile constituents separated by fractional condensation with the subsequent recovery of diboron tetrafluoride. The diboron tetrafluoride was identified by vapor pressure, molecular weight, melting point and infrared spectrum determinations which were substantially the same as the known data for diboron tetrafluoride.

III. Tetraethoxydiboron and about 2% less than the stoichiometric amount of sulfur tetrafluoride (as shown in the foregoing equations) were mixed at −80° C. or below, in an anhydrous oxygen-free system. The temperature of the reaction mixture was then raised to about −80° C. and held there for a period of 17.5 hours. The reaction mass was then warmed slowly to room temperature and the volatile constituents separated by fractional condensation with the subsequent recovery of diboron tetrafluoride. The diboron tetrafluoride was identified as in the foregoing examples and was found to be substantially identical with the known data for diboron tetrafluoride.

Diboron tetrafluoride, as stated previously, has many desirable properties which provide this compound with a variety of uses. Dibron tetrafluoride is a very effective dehydrating agent reacting with water to yield hydrogen fluoride and it is also an extremely active antioxidant. When heated to high temperatures in a reducing atmosphere it decomposes and elemental boron is produced. Diboron tetrafluoride can also be used for the preparation of polymers. Diboron tetrafluoride also reacts with unsaturated compounds producing diboronic acid derivatives which are very difficult or impossible to prepare by conventional processes.

Other modes of applying the principle of the invention may be employed, change being made as regards the details described, provided the features stated in the following claim or the equivalent of such be employed.

We, therefore, particularly point out and distinctly claim as our invention:

The method for preparing diboron tetrafluoride which comprises reacting boron monoxide with about the stoichiometric amount of sulfur tetrafluoride, in a substantially anhydrous oxygen-free atmosphere at a temperature of from about 0° C. to about −100° C. and recovering substantially pure dibron tetrafluoride from the reaction mass.

References Cited by the Examiner
UNITED STATES PATENTS

| | | | |
|---|---|---|---|
| 2,904,398 | 5/59 | Smith | 23—205 X |
| 2,946,668 | 7/60 | Richelsen | 23—205 X |
| 3,006,730 | 10/61 | McCloskey et al. | 23—205 |

MAURICE A. BRINDISI, *Primary Examiner.*